(12) United States Patent
Wang et al.

(10) Patent No.: US 9,520,146 B1
(45) Date of Patent: *Dec. 13, 2016

(54) METHOD OF FORMING A FULLY WRAPPED-AROUND SHIELDED PMR WRITER POLE

(71) Applicant: Western Digital (Fremont), LLC, Fremont, CA (US)

(72) Inventors: Jinwen Wang, Pleasanton, CA (US); Weimin Si, San Ramon, CA (US); Jianxin Fang, San Jose, CA (US); Ying Hong, Los Gatos, CA (US); Hongzhou Jiang, Fremont, CA (US); Ching-Huang Lu, Fremont, CA (US); Yan Chen, Fremont, CA (US); Donghong Li, Pleasanton, CA (US); Lien-Chang Wang, Fremont, CA (US); Lieping Zhong, San Jose, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 13/972,002

(22) Filed: Aug. 21, 2013

Related U.S. Application Data

(63) Continuation of application No. 13/275,926, filed on Oct. 18, 2011, now Pat. No. 8,533,937.

(51) Int. Cl.
G11B 5/127 (2006.01)
H04R 31/00 (2006.01)
G11B 5/11 (2006.01)
G11B 5/31 (2006.01)

(52) U.S. Cl.
CPC ............. *G11B 5/112* (2013.01); *G11B 5/1278* (2013.01); *G11B 5/1276* (2013.01); *G11B 5/3153* (2013.01)

(58) Field of Classification Search
USPC . 29/603.11, 603.13–603.16, 603.18; 216/22, 39, 41, 48, 65; 360/121, 122, 317; 451/5, 41
See application file for complete search history.

(56) References Cited

U.S. PATENT DOCUMENTS

| | | | |
|---|---|---|---|
| 6,238,582 B1 | 5/2001 | Williams et al. | |
| 7,024,756 B2* | 4/2006 | Le et al. | 29/603.12 |
| 7,382,577 B2 | 6/2008 | Han et al. | |
| 7,392,577 B2* | 7/2008 | Yazawa et al. | 29/603.12 |
| 7,573,683 B1* | 8/2009 | Benakli et al. | 360/319 |

(Continued)

OTHER PUBLICATIONS

D. Kleinberg; "Applications of Reactive Ion Beam Etching to Thin Film Magnetic Head Track-Width Trimming," Veeco Instruments, Inc., printed from www.veeco.com on Oct. 18, 2011.

(Continued)

*Primary Examiner* — Paul D Kim (57) ABSTRACT

A method of forming a wrapped-around shielded perpendicular magnetic recording writer pole is disclosed. A structure comprising a leading shield layer and an intermediate layer disposed over the leading shield layer is provided, the intermediate layer comprising a pole material and a dielectric material. A trench is formed in the dielectric material. A non-magnetic layer in the trench is removed via an ion beam etching process. A seed layer is deposited in the trench and over the pole material. A magnetic material comprising a side shield layer is deposited on at least a portion of the seed layer.

12 Claims, 6 Drawing Sheets

(56) References Cited

U.S. PATENT DOCUMENTS

| | | | |
|---|---|---|---|
| 8,139,320 B2* | 3/2012 | Hsiao et al. | 360/125.07 |
| 8,196,285 B1* | 6/2012 | Zhang et al. | 29/603.13 |
| 8,225,488 B1* | 7/2012 | Zhang et al. | 29/603.16 |
| 8,533,937 B1 | 9/2013 | Wang et al. | |
| 2002/0111010 A1* | 8/2002 | Walker et al. | 438/614 |
| 2008/0218910 A1 | 9/2008 | Kojima et al. | |
| 2011/0102942 A1 | 5/2011 | Bai et al. | |
| 2012/0304454 A1* | 12/2012 | Jiang et al. | 29/603.18 |

OTHER PUBLICATIONS

Office Action dated Feb. 8, 2013 in U.S. Appl. No. 13/275,926.
Notice of Allowance dated May 13, 2013 in U.S. Appl. No. 13/275,926.

\* cited by examiner

Prior Art

Fig. 1A

Prior Art

*Fig. 1B*

Prior Art

DEPOSITION WITH VERTICAL ANGLE

Fig. 4A

DEPOSITION WITH TILTED ANGLE

Fig. 4B

METHOD OF FORMING A FULLY WRAPPED-AROUND SHIELDED PMR WRITER POLE

CROSS-REFERENCE TO RELATED APPLICATIONS

This application is a continuation of U.S. patent application Ser. No. 13/275,926, filed on Oct. 18, 2011, now U.S. Pat. No. 8,533,937 which is incorporated herein by reference in its entirety.

FIELD OF THE INVENTION

The present invention generally relates to magnetic recording and, in particular, relates to method of forming a fully wrapped-around shielded PMR writer pole.

BACKGROUND

The increasing need for high recording area densities (up to 500 Gb/in2) is making the perpendicular magnetic recording head (PMR head) a replacement of choice for the longitudinal magnetic recording head (LMR head).

In fully wrapped-around shielded (FWAS) PMR writer heads, a continuous shield surrounding the pole provides a continuous magnetic flux from leading shield (LS) to side shield (SS). In order to achieve a seamless interface between the leading shield and side shield block, an appropriate pre-etch step is adopted to provide a clean surface on leading shield before side shield seed deposition. But the re-entrant shape of pole and surrounding structures produces a shadowing effect which makes it extremely difficult for a standard parallel plate etching technique such as the sputter etching to reach and clean the target SS deposition area around the pole, especially in the bottom corner of the pole.

Figure 1A:
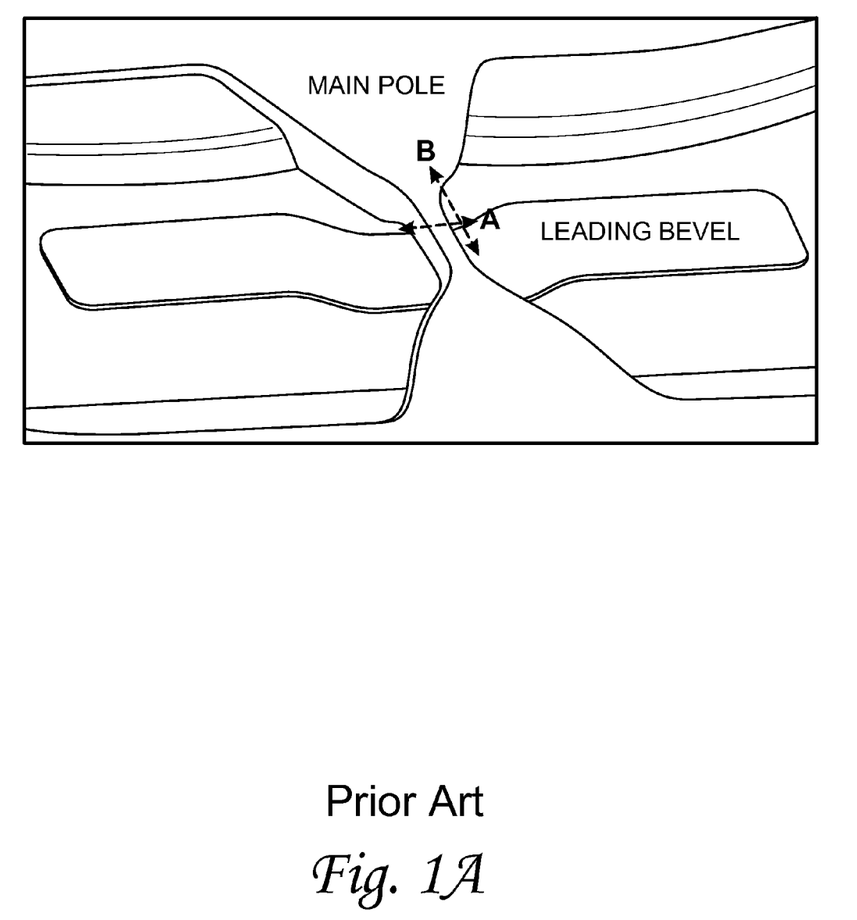
FIG. 1A is a diagram depicting a top view of a target SS deposition area around a pole.
Figure 1B:
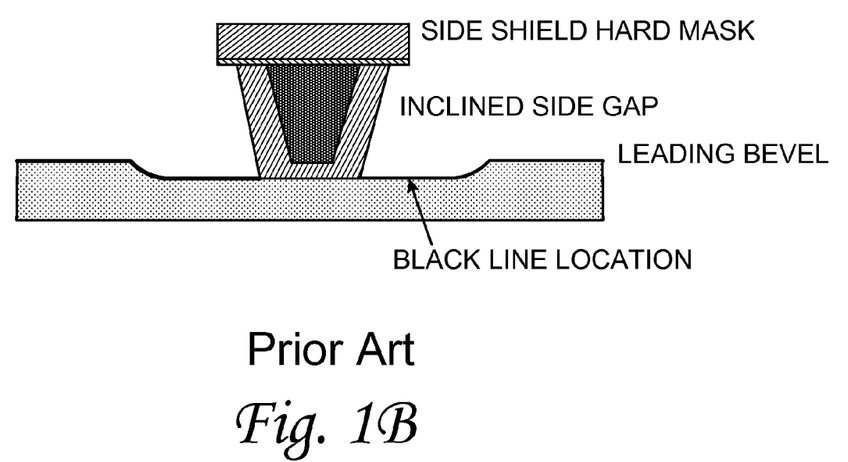
FIG. 1B is a diagram depicting a cross-sectional view of the target SS deposition area along the cross-section A indicated in FIG. 1A.
Figure 1C:
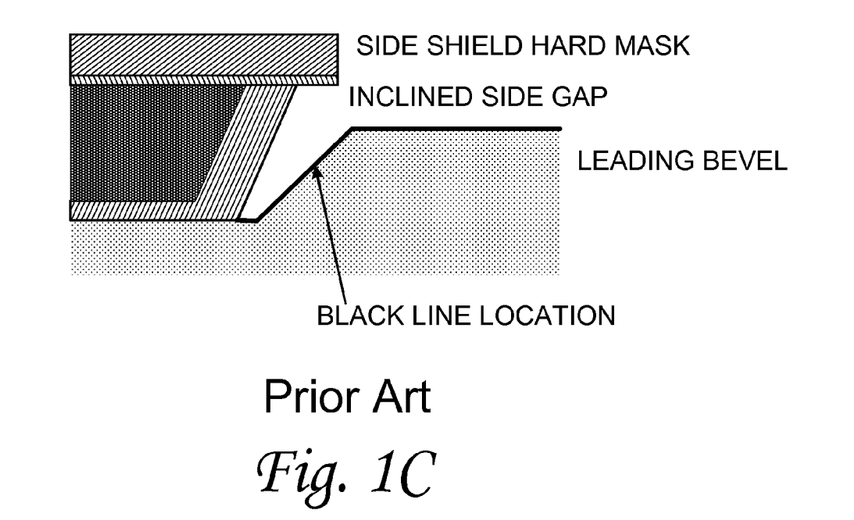
FIG. 1C is a diagram depicting a cross-sectional view of the target SS deposition area along the cross-section B indicated in FIG. 1A.

FIGS. 1A-C are figures that illustrate the aforementioned shadow effects. FIG. 1A is a diagram depicting a top view of a target side shield (SS) deposition area around a pole. FIG. 1B is a diagram depicting a cross-sectional view of the target SS deposition area along the cross-section A indicated in FIG. 1A. FIG. 1B illustrates the shadowed or "black line" location on the leading bevel. FIG. 1C is a diagram depicting a cross-sectional view of the target SS deposition area along the cross-section B indicated in FIG. 1A. FIG. 1C likewise illustrates the black line location on the leading bevel.

As illustrated in FIGS. 1B and C, the black line to be removed is trapped in the deep bottom of a well which is surrounded by the overhang above the main pole, inclined side gap, and leading bevel slope, which present a formidable obstacle to providing a clean interface between the LS and the SS. This is especially true since sputter etching, which is traditionally used for cleaning the LS-SS interface, has no wafer tilt function to circumvent the shadowing effect. Accordingly, only the surface at open field can be effectively cleaned by the sputter etch with the dark line remaining at the corner areas. The presence of the dark line compromises the structural integrity and/or produces a magnetic discontinuity between the LS and SS regions, which in turn can cause adjacent track interference (ATI) issues in the resulting FWAS PMR writer pole.

BRIEF SUMMARY OF THE INVENTION

The present disclosure addresses this and other problems by utilizing an ion beam etching (IBE) process with tunable tilt angles to reduce or eliminate the shadowing effect associated with the conventional sputter etching process, and, in some embodiments, by further utilizing a suitable ion beam deposition (IBD) process performed at an optimized angle to obtain better deposition coverage around pole.

In certain aspects, a method of forming a wrapped-around shielded perpendicular magnetic recording writer is provided. The method comprises providing a structure comprising a leading shield layer and an intermediate layer disposed over the leading shield layer, the intermediate layer comprising a pole material and a dielectric material. The method can further comprise forming a trench in the dielectric material. The method can further comprise removing a non-magnetic layer in the trench via an ion beam etching process. The method can further comprise depositing a seed layer in the trench and over the pole material. The method can further comprise depositing a magnetic material comprising a side shield layer on at least a portion of the seed layer.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 2:
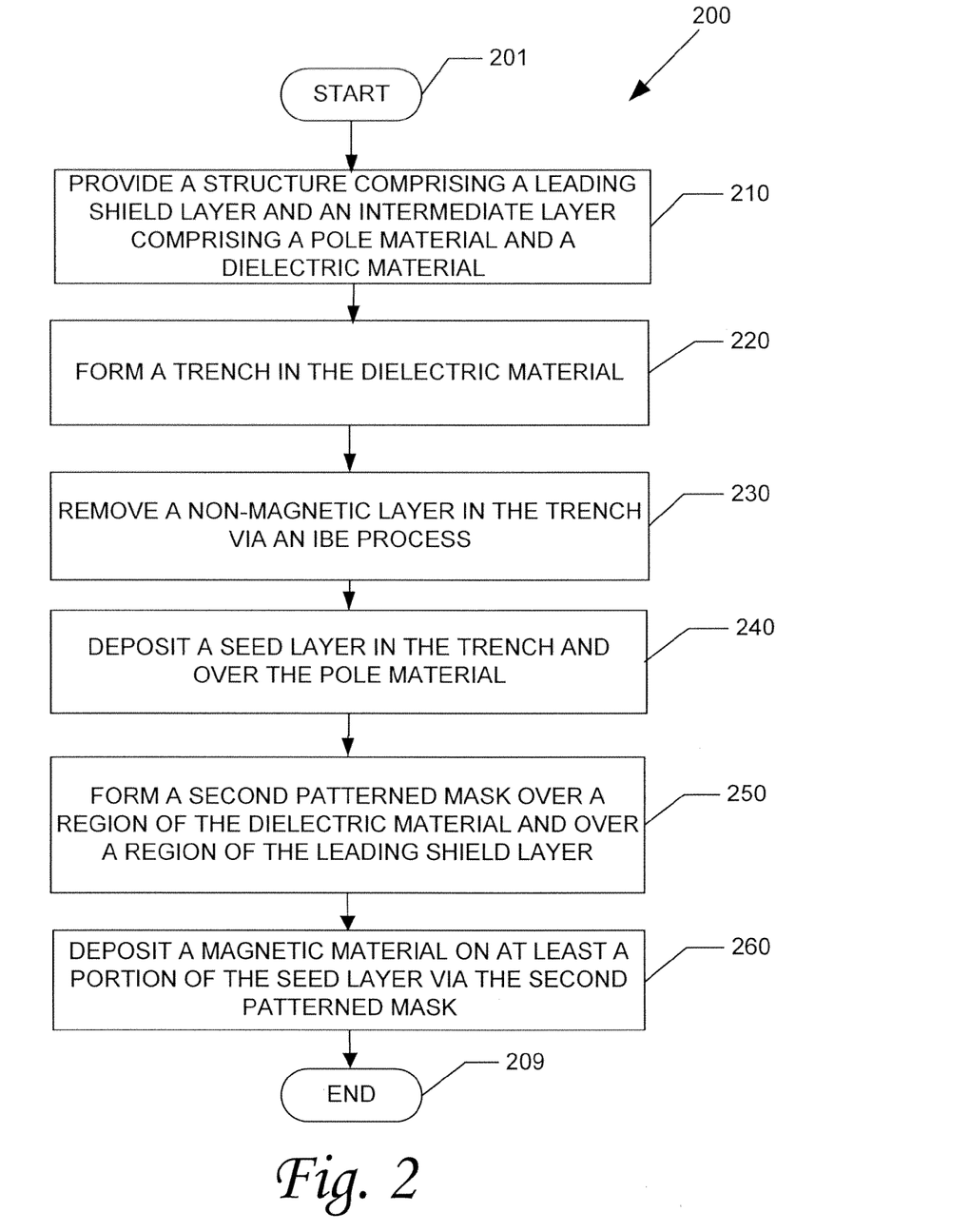
FIG. 2 is a flowchart illustrating an exemplary process for forming a fully wrapped-around shielded (FWAS) perpendicular magnetic recording (PMR) writer pole according to certain aspects of the present disclosure.

FIG. 2 is a flowchart illustrating an exemplary process 200 for forming a fully wrapped-around shielded (FWAS) perpendicular magnetic recording (PMR) writer pole according to certain aspects of the present disclosure. FIGS. 3A-D represent a sequence of diagrams illustrating various exemplary intermediate structures arrived at during the course of the exemplary process 200 of FIG. 2 according to certain aspects of the present disclosure. For ease of illustration, without any intent to limit the scope of disclosure in any way, the exemplary fabrication process 200 of FIG. 2 will be described with reference to the exemplary intermediate structures of FIGS. 3A-D.

Figure 3A:
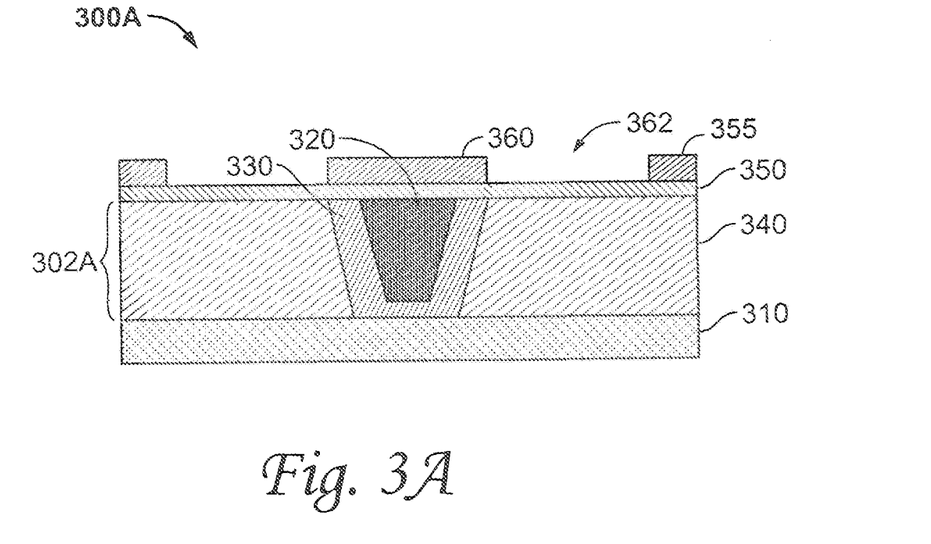
FIGS. 3A-D represent a sequence of diagrams illustrating various exemplary intermediate structures arrived at during the course of the exemplary process of FIG. 2 according to certain aspects of the present disclosure.

With reference to FIG. 3A, the process 200 begins as start state 201 and proceeds to operation 210 in which an exemplary intermediate structure 300A comprising a leading shield layer 310 and an intermediate layer 302A disposed over the leading shield layer 310 is provided. In the illustrated example, the intermediate layer 302A comprises a pole material 320 and a dielectric material 340 disposed adjacent to the pole material 320, and a side gap 330 disposed between the pole material 320 and the dielectric material 340. In certain embodiments, the pole material 220 comprises an element selected from the group consisting of Co, Ni and Fe, and the dielectric material comprises alumina ($Al_2O_3$). In some embodiments, the side gap 230 comprises one of more of Ru, Ta, and Ti.

The intermediate structure 300A of FIG. 3A further comprises a hard mask layer 350 disposed over the intermediate layer 302A and a first patterned mask 355 having first patterned openings 362 disposed over the hard mask layer 350.

Figure 3B:
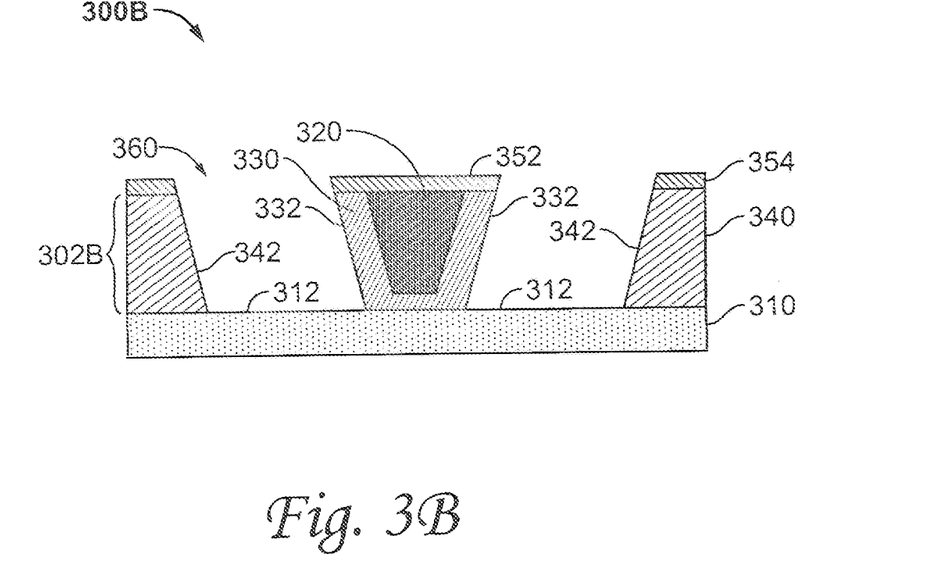

With reference to an exemplary intermediate structure 300B of FIG. 3B, the process 200 proceeds to operation 220 in which a trench 360 is formed in the dielectric material 340 by, for example, removing a portion of the dielectric material 340 below the first patterned openings 362 using a wet etching process. As seen in FIG. 3B, the trench 360 is surrounded by a first side surface 342 associated with the remaining dielectric material 340 on one side, a second side surface 332 associated with the side gap 330 on the other side, and an exposed surface 312 associated with the leading shield layer 310 at the bottom.

During formation of the trench 360, an undesirable non-magnetic layer is typically formed on the surfaces 332, 342, and 312 surrounding the trench 360. The non-magnetic layer on the surface 312 can comprise an oxidized portion in a top section of the leading shield layer 210. The non-magnetic layer can also comprise residual chemical etchant and/or photoresist material from the first patterned mask 355. Regardless of the origin, the non-magnetic layer is undesirable because it tends to reduce the structural integrity and/or produce magnetic discontinuity in the LS-SS interface and needs to be removed as much as possible before depositing a magnetic seed layer in a subsequent operation 240.

Still with reference to the intermediate structure 300B of FIG. 3B, the process 200 proceeds to operation 230 in which the aforementioned non-magnetic layer formed on the surrounding surfaces 332, 342 and 312 is removed via an ion beam etching (IBE) process. Unlike the conventional sputter etching process, the IBE process involves a set of ion milling steps with tunable tilt angles. As such, the IBE process allows for more targeted cleaning of the shadowed regions of the surface 312, thereby producing a uniformly clean LS-SS interface, and also cleaning of other surrounding surfaces 332 and 342. For example, during the IBE process, the intermediate structure 300B can be tilted in a number of selected directions.

Figure 3C:
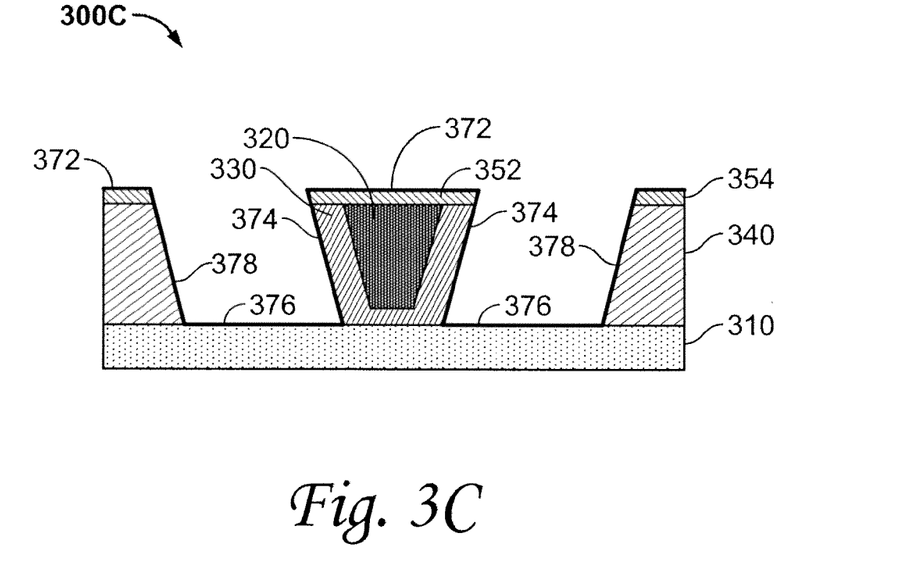

With reference to an exemplary intermediate structure 300C of FIG. 3C, the process 200 proceeds to operation 240 in which a seed layer is formed on the exemplary intermediate structure 300B of FIG. 3B. In the illustrated example, the seed layer is deposited over the entire wafer comprising the structure 300B. The seed layer includes seed layer 372 deposited the remaining hard mask 354, seed layer 374 deposited on the side surface 332 (FIG. 3B) associated with the side gap 330, seed layer 376 deposited on the exposed surface 312 (FIG. 3B) of the leading shield layer 310, and seed layer 378 deposited on the side surface 342 associated with the dielectric material 340. In certain embodiments, the seed layer 372, 374, 376, 378 is deposited via a chemical vapor deposition (CVD) process. In other embodiments, the seed layer 372, 374, 376, 378 is deposited via a physical vapor deposition (PVD) process including an ion beam deposition (IBD) process. In some embodiments, the seed layer 372, 374, 376, 378 is between about 100 and 500 Å thick.

Figure 4A:
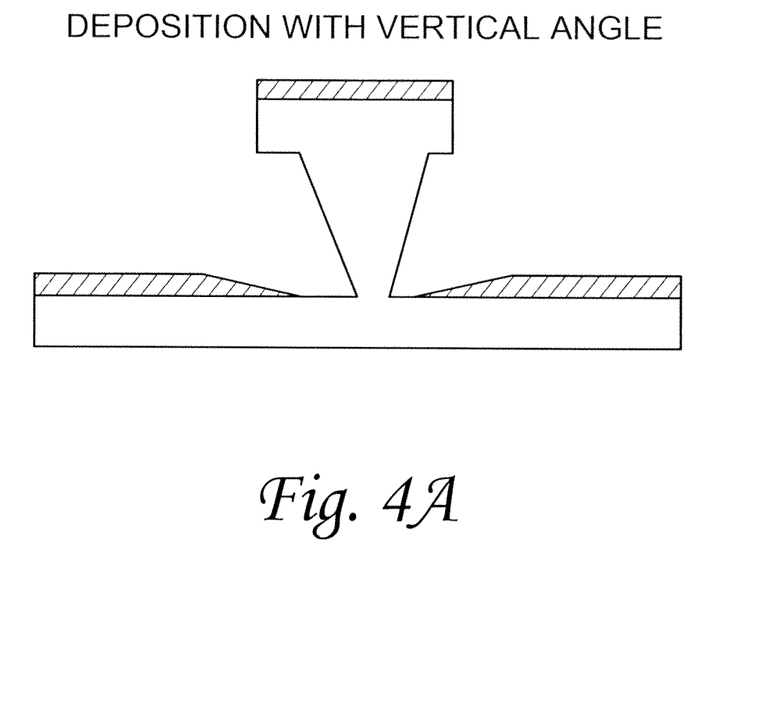
FIG. 4A is an image representing seed layer coverage in the target SS deposition area when the deposition direction is close to a perpendicular angle.
Figure 4B:
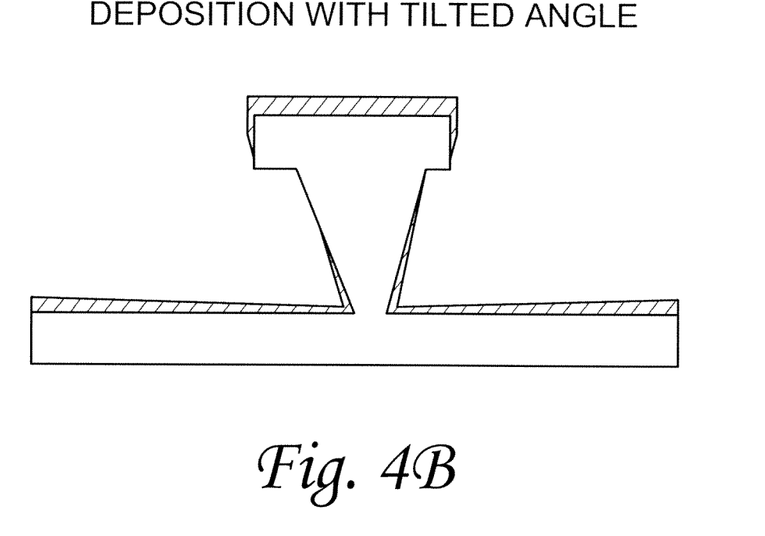
FIG. 4B is an image representing seed layer coverage in the target SS deposition area when the deposition direction is at a tilt angle in the range between about 35 and 45 degrees.

The IBD process is especially advantageous for the seed layer deposition as it allows for a deposition at an optimized angle to obtain better deposition coverage in the shadowed regions around the pole 320. Studies on seed layer coverage resulting from IBD process at different deposition directions have been performed. As illustrated in FIG. 4A, when the deposition direction is close to a perpendicular angle, which is the situation with the plasma sputtering deposition process, there is obvious broken part in the deposited film in the area at the bottom corner of the pole due to the shadow effect from the side gap 330 and the overhang of the pole 320. By comparison, as illustrated in FIG. 4B, when the deposition direction is set at a tilt angle in the range between about 35 and 45 degrees, the shadow effect is effectively eliminated, and the coating area surrounding the pole 320 is substantially extended. At the same time, the deposited film uniformity (defined by within wafer sigma) is decreased from >3% to <1%, providing a much flatter seed layer having a uniform thickness.

In some embodiments, the IBE process associated with the cleaning operation 230 is performed on the structure 300B in a first vacuum chamber, and the IBD process associated with the seed layer deposition operation 240 is performed on the cleaned structure in a second vacuum chamber. To eliminate the possibility of producing a further oxidation layer, the structure 300B is maintained substantially in a vacuum condition while the structure is transferred from the first vacuum chamber to the second vacuum chamber.

Figure 3D:
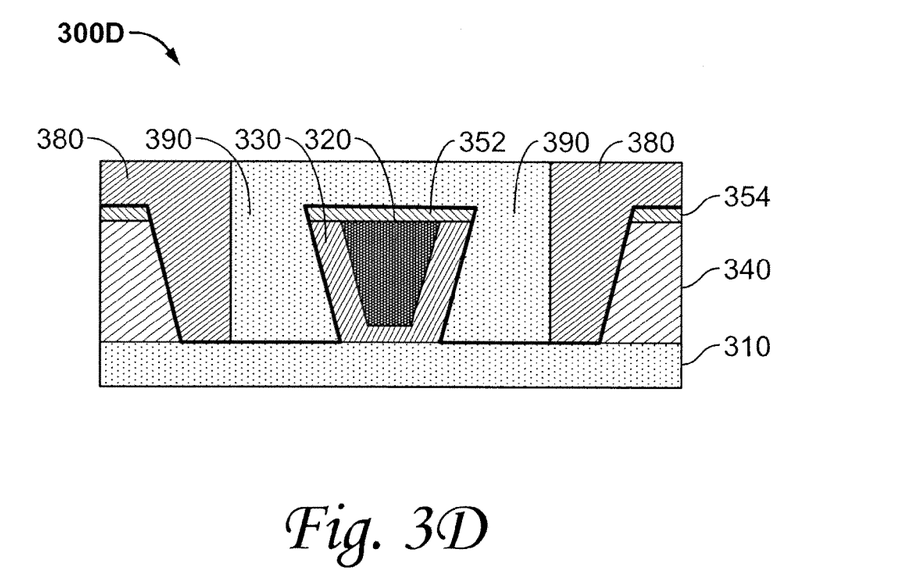

With reference to exemplary intermediate structure 300D of FIG. 3D, the process 200 proceeds to operation 250 in which a second patterned mask 380 is formed over a region of the dielectric material 340 and a region of the leading shield layer 310. In certain embodiments, the operation 250 typically involves depositing a photoresist material over the intermediate structure 300C of FIG. 3C and performing a photolithography on the photoresist material to provide a second patterned opening in a region above and around the pole material 320.

The process 200 proceeds to operation 260 in which, still with reference to the exemplary intermediate structure 300D of FIG. 3D, a magnetic material 390 is deposited on at least a portion of the seed layer via the second patterned mask 372, thereby forming the side shield (SS) portion of the fully wrapped-around shielded (FWAS) PMR writer pole. In certain embodiments, the magnetic material 390 is electroplated on the portion of the seed layer. In the illustrated example of FIG. 3D, the magnetic material is deposited on the seed layer 374 and a portion of the seed layer 372 and 376 not covered by the second patterned mask 380.

In some embodiments, the magnetic material 390 comprises an alloy of Ni, Fe and Co. The side shield layer formed from deposition of the magnetic material 390 is between about 4000 and 7000 Å thick. In certain embodiments, the magnetic material 390 comprising the side shield layer is the same as the magnetic material comprising the leading shield layer 310. In other embodiments, the magnetic material 390 comprising the side shield layer is different from the magnetic material comprising the leading shield layer 310.

Those skilled in the art will appreciate that various embodiments of the subject disclosure provide a number of advantages. For example, the use of ion beam etching provides a clean interface between the side shield region and the leading shield region of the FWAS PWR writer pole, which is beneficial to avoid potential ATI issue on the writer performance. The use of ion beam deposition (IBD) process for depositing the seed layer for side shield plating provides better (e.g., more uniform) coverage of the seed layer, which is beneficial to the subsequent growth of the side shield plating.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method of forming a wrapped-around shielded perpendicular magnetic recording writer pole, the method comprising:
   providing a structure comprising a leading shield layer and an intermediate layer disposed over the leading shield layer, the intermediate layer comprising a pole material and a dielectric material;
   forming a trench in the dielectric material by forming a first patterned mask layer having a first patterned opening over the intermediate layer, and removing a portion of the dielectric material below the first patterned opening, wherein a non-magnetic layer is formed in the trench during formation of the trench, the non-magnetic layer comprising an oxidized portion of a top surface of the leading shield layer;
   removing the non-magnetic layer in the trench via an ion beam etching process;
   depositing a seed layer in the trench and over the pole material; and
   depositing a magnetic material comprising a side shield layer on at least a portion of the seed layer.

2. The method of claim 1, wherein the portion of the dielectric material is removed via a wet etching process.

3. The method of claim 1, wherein the non-magnetic layer further comprises a photoresist residue.

4. The method of claim 1, wherein the seed layer is deposited over an entire wafer comprising the structure.

5. A method of forming a wrapped-around shielded perpendicular magnetic recording writer pole, the method comprising:
   providing a structure comprising a leading shield layer and an intermediate layer disposed over the leading shield layer, the intermediate layer comprising a pole material and a dielectric material;
   forming a trench in the dielectric material, wherein a non-magnetic layer is formed in the trench during formation of the trench;
   removing the non-magnetic layer in the trench via an ion beam etching process;
   depositing a seed layer in the trench and over the pole material; and
   depositing a magnetic material comprising a side shield layer on at least a portion of the seed layer,
   wherein the structure is tilted during the ion beam etching process.

6. The method of claim 5 further comprising forming a second patterned mask having a second patterned opening over a region of the dielectric material and over a region of the leading shield layer, wherein the magnetic material is deposited via the second patterned opening of the second patterned mask.

7. The method of claim 6, wherein the seed layer is deposited via a chemical vapor deposition (CVD) process.

8. The method of claim 6, wherein the seed layer is deposited via a physical vapor deposition (PVD) process.

9. The method of claim 8, wherein the PVD process is an ion beam deposition process.

10. The method of claim 9, wherein the structure is tilted during the ion beam deposition process.

11. The method of claim 10, wherein the ion beam etching process is performed on the structure in a first vacuum chamber, and the ion beam deposition process is performed on the structure in a second vacuum chamber after the structure has been transferred from the first vacuum chamber to the second vacuum chamber.

12. The method of claim 11, wherein the structure is maintained substantially in a vacuum condition while the structure is transferred from the first vacuum chamber to the second vacuum chamber.

* * * * *